United States Patent
Meserole et al.

(10) Patent No.: US 11,655,330 B2
(45) Date of Patent: May 23, 2023

(54) ARTICLE INCLUDING A SUBSTRATE, A PHOSPHATE BINDING LAYER AND A FLUOROPLYETHER LAYER

(71) Applicants: DAIKIN AMERICA, INC., Orangeburg, NY (US); DAIKIN INDUSTRIES, LTD., Osaka (JP)

(72) Inventors: Chad Aaron Meserole, Madison, AL (US); Abundio Jimenez Sandoval, Decatur, AL (US)

(73) Assignees: DAIKIN AMERICA, INC., Orangeburg, NY (US); DAIKIN INDUSTRIES, LTD., Osaka (JP)

( * ) Notice: Subject to any disclaimer, the term of this patent is extended or adjusted under 35 U.S.C. 154(b) by 279 days.

(21) Appl. No.: 16/768,345

(22) PCT Filed: Dec. 4, 2018

(86) PCT No.: PCT/JP2018/044624
§ 371 (c)(1),
(2) Date: May 29, 2020

(87) PCT Pub. No.: WO2019/111915
PCT Pub. Date: Jun. 13, 2019

(65) Prior Publication Data
US 2020/0362089 A1    Nov. 19, 2020

Related U.S. Application Data

(60) Provisional application No. 62/594,425, filed on Dec. 4, 2017.

(51) Int. Cl.
| | |
|---|---|
| *C08G 18/62* | (2006.01) |
| *C08G 18/09* | (2006.01) |
| *C09D 5/00* | (2006.01) |
| *C09D 175/04* | (2006.01) |
| *B32B 15/08* | (2006.01) |

(52) U.S. Cl.
CPC ....... *C08G 18/6279* (2013.01); *C08G 18/092* (2013.01); *C09D 5/002* (2013.01); *C09D 175/04* (2013.01)

(58) Field of Classification Search
None
See application file for complete search history.

(56) References Cited

U.S. PATENT DOCUMENTS

| 4,526,833 A | 7/1985 | Burguette et al. |
| 4,536,225 A * | 8/1985 | Cayless .............. C23F 11/1673 148/250 |
| 2004/0181008 A1 | 9/2004 | Hanazawa et al. |

FOREIGN PATENT DOCUMENTS

| WO | 03/002628 A1 | 1/2003 |
| WO | 2015/142894 A1 | 9/2015 |

OTHER PUBLICATIONS

International Search Report for PCT/JP2018/044624 dated Feb. 19, 2019 [PCT/ISA/210].
Written Opinion for PCT/JP2018/044624 dated Feb. 19, 2019 [PCT/ISA/210].

* cited by examiner

*Primary Examiner* — Ramsey Zacharia
(74) *Attorney, Agent, or Firm* — Sughrue Mion, PLLC

(57) ABSTRACT

An article including a metal substrate, a phosphate binding layer, and a fluoropolyether layer. Also disclosed is a process for producing the article which includes (i) treating a surface of the metal substrate with a phosphoric acid derivative to form the phosphate binding layer on the surface of the metal substrate, and (ii) treating a surface of the phosphate binding layer with a fluoropolyether compound having a fluoropolyether group and a carbon-carbon double bond to form the fluoropolyether layer on the surface of the phosphate binding layer.

3 Claims, No Drawings

US 11,655,330 B2

ARTICLE INCLUDING A SUBSTRATE, A PHOSPHATE BINDING LAYER AND A FLUOROPLYETHER LAYER

CROSS REFERENCE TO RELATED APPLICATIONS

This application is a National Stage of International Application No. PCT/JP2018/044624 filed Dec. 4, 2018, claiming priority based on U.S. Provisional Application No. 62/594,425 filed Dec. 4, 2017.

TECHNICAL FIELD

The present disclosure relates generally to an article having a laminated structure.

BACKGROUND ART

Metal surfaces are attractive and generally durable. Metals display an array of beautiful colors, to the point that many English words for such colors are actually the words for the metals themselves (e.g., bronze, copper, silver, etc.). Metals can also be produced with striking surface textures, such as by burnishing, brushing, polishing, and studding. However, they are vulnerable to chemical reactions such as oxidation, corrosion, and staining. Metals are very hydrophilic, and will slowly dissolve if exposed to aqueous liquids. They also have a tendency to absorb aqueous contaminants, which can cause staining. Although metals are not attacked by most oils, oils (and other hydrophobic liquids) often carry additives that can damage metals. Consequently, it is desirable to provide a protective coating for metal surfaces, especially if the outward appearance of the metal surface must be preserved.

Therefore, there is a need in the art for a coating layer for metal surfaces that does not destroy the ornamental appearance and feel of the metal surface, but provides water-repellency, oil-repellency, antifouling property, or the like.

As a method of forming a layer providing water-repellency, oil-repellency, and antifouling property on a surface of a base material, a method using a composition containing a carbon-carbon double bond is known, which comprises (A) a triisocyanate prepared by trimerizing a diisocyanate, and (B) a combination of at least two active hydrogen-containing compounds wherein the component (B) comprises (B-1) a perfluoropolyether having at least one active hydrogen, and (B-2) a monomer having an active hydrogen and a carbon-carbon double bond (Patent Literature 1).

CITATION LIST

Patent Literature

Patent Literature 1: WO 2003-002628 A

SUMMARY OF INVENTION

Problem to be Solved by the Invention

An object of the present invention is to provide an article comprising a metal substrate and having excellent water-repellency, oil-repellency and antifouling property.

Means to Solve the Problem

The present disclosure provides the following embodiments.
1. An article of the present disclosure comprises a metal substrate, a phosphate binding layer, and a fluoropolyether layer.
2. The article according to embodiment 1 wherein the fluoropolyether layer is formed of a fluoropolyether compound having a fluoropolyether group and a carbon-carbon double bond.
3. The article according to embodiment 2 wherein the fluoropolyether compound having a fluoropolyether group and a carbon-carbon double bond is a compound obtained by reacting:
(A) a triisocyanate prepared by trimerizing a diisocyanate, with
(B) a combination of at least two active hydrogen-containing compounds wherein the component (B) comprises:
(B-1) a fluoropolyether having at least one active hydrogen, and
(B-2) a monomer having an active hydrogen atom and a carbon-carbon double bond.
4. The article according to any one of embodiments 1-3 wherein the phosphate binding layer is formed of a phosphoric acid derivative.
5. The article according to embodiment 4 wherein the phosphoric acid derivative is a compound of the formula:

[Chem.1]

$$O=P(-(O)_r-R^{12}-O-CO-CR^{11}=CH_2)_\alpha(OH)_\beta \text{ or}$$

$$CH=CR^{11}-CO-O-N(-R^{13}-\overset{O}{\underset{\|}{P}}(OH)_2)_2$$

wherein:
$R^{11}$ is each independently H or a $C_{1-3}$ alkyl group,
$R^{12}$ is each independently a divalent organic group,
$R^{13}$ is each independently a divalent organic group,
r is each independently 0 or 1,
α is 1 or 2, and
β is 1 or 2.
6. The article according to any one of embodiments 1-5 wherein the metal substrate is a SUS substrate or an Al substrate.
7. The article according to any one of embodiments 1-6 wherein the metal substrate is a SUS substrate.
8. A process for producing an article of the present disclosure comprises a metal substrate, a phosphate binding layer, and a fluoropolyether layer comprising:
(i) treating a surface of the metal substrate with a phosphoric acid derivative to form the phosphate binding layer on the surface of the metal substrate, and
(ii) treating a surface of the phosphate binding layer with a fluoropolyether compound having a fluoropolyether group and a carbon-carbon double bond to form the fluoropolyether layer on the surface of the phosphate binding layer.
9. The process for producing according embodiment 8 further comprising irradiating the phosphate binding layer and the fluoropolyether layer with ultraviolet light.

DESCRIPTION OF EMBODIMENTS

A. Definitions

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this detailed description are approximate unless stated otherwise, meaning that the term "about" or "approximately" can be inferred when not expressly stated. Numerical quantities in the claims are exact unless stated otherwise.

The terminology used herein is for the purpose of describing particular embodiments only and is not intended to be limiting. As used herein, the singular forms "a", "an" and "the" are intended to include the plural forms as well, unless the context clearly indicates otherwise.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. Importantly, this term excludes such other elements that adversely affect the operability of what is claimed for its intended purpose as stated in this disclosure, even if such other elements might enhance the operability of what is claimed for some other purpose.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, or other reaction. The term "substituted" is also contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein above. One specific example includes an isocyanurate group, such as a tri-substituted isocyanurate group. The permissible substituents may be one or more and the same or different for appropriate organic compounds. For purposes of this invention, the heteroatoms such as nitrogen may have hydrogen substituents and/or any permissible substituents of organic compounds described herein which satisfy the valences of the heteroatoms. This invention is not intended to be limited in any manner by the permissible substituents of organic compounds.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The term "active hydrogen" as used herein means that a hydrogen atom which can be removed as a proton. The "active hydrogen containing group" means a group containing the active hydrogen described above, and includes, for example, a —OH group, a —C(═O)H group, a —SH group, a —SO$_3$H group, a —SO$_2$H group, a —SOH group, a —NH$_2$ group, a —NH— group, a —SiH group, and the like.

B. Article

An article of the present disclosure comprises a metal substrate, a phosphate binder layer, and a fluoropolyether layer.

A metal of the substrate includes Ag, Al, Cd, Fe, Mn, Pb, Sn, U, Zn, Cr, Cu, Ni and an array thereof such as a stainless steel (for example, SUS 200 series, SUS 300 series such as SUS304 and SUS316, SUS 400 series such as SUS430, etc.) and brass preferably Al and the stainless steel, more preferably the stainless steel.

The shape of the substrate is not specifically limited. The region of the surface of the substrate on which the surface treating layer should be formed may be at least a part of the surface of the substrate, and may be appropriately determined depending on use, the specific specification, and the like of the article to be produced.

A surface of the metal substrate to be treated with a composition for preparing the phosphate binding layer or the fluoropolyether layer may be a metal surface or a metal oxide surface.

The metal substrate may be pre-treated before it is treated with the phosphoric acid derivative or a composition comprising the phosphoric acid derivative as described below.

The pre-treatment includes scrubbing with acetone or alcohol, rinsing with water, exposing to UV and/or ozone.

The phosphate binding layer is formed of a phosphoric acid derivative.

In one embodiment, the phosphate binding layer is formed by treating the metal substrate with the phosphoric acid derivative. The phosphoric acid derivative may be used as a composition comprising the phosphoric acid derivative.

The phosphoric acid derivative is a compound comprising a P—OH moiety.

In one embodiment, the phosphoric acid derivative is a compound of the following formula:

[Chem.2]

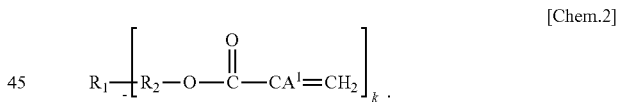

wherein:

A$^1$ is H, Cl, F, Br, methyl, ethyl, propyl, cyano, substituted or unsubstituted group selected from alkyl, alkenyl, alkynyl, or a combination thereof, R$_1$ is a metal or metal oxide binding group;

R$_2$ is an optional substituted or unsubstituted group selected from alkyl, alkenyl, alkynyl, or a combination thereof; and k is an integer greater than 0.

In one embodiment, the phosphoric acid derivative is a compound of the following formula:

[Chem.3]

or

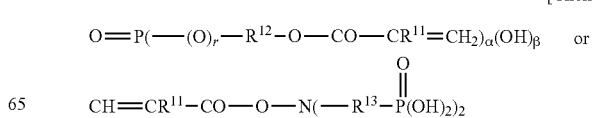

wherein:

$R^{11}$ is each independently H or a $C_{1-3}$ alkyl group,
$R^{12}$ is each independently a divalent organic group,
$R^{13}$ is each independently a divalent organic group,
r is each independently 0 or 1,
α is 1 or 2, and
β is 1 or 2.

$R^{11}$ is preferably each independently H or methyl.

$R^{12}$ is preferably each independently —$(CH_2)_{n1}$—, —$(CH_2)_{n2}$—CO—O—$(CH_2)_{n3}$—, or —$NR^{14}$—$R^{15}$—$R^{16}$— wherein n1 is an integer of 1-6, preferably an integer 2-3.
n2 is an integer of 1-6, preferably an integer of 2-4,
n3 is an integer of 1-20, preferably an integer of 2-15, more preferably an integer 5-10,
$R^{14}$ is H or a $C_{1-3}$ alkyl group, preferably H or methyl, more preferably H,
$R^{15}$ is a single bond or phenylene,
$R^{16}$ is a single bond or —$(CH_2)_{n4}$—, and
n4 is an integer of 1-6, preferably an integer 1-3.

$R^{13}$ is preferably each independently —$(CH_2)_{n5}$— wherein n5 is an integer of 1-6, preferably an integer 2-3.

Examples of the phosphoric acid derivative include, but are not limited to, for example:
bis[2-(methacryloyloxy)ethyl]phosphate,
phosphoric acid 2-hydroxyethylmethacrylate ester,
mono(2-acryloyloxyethyl)acid phosphate,
mono(2-methacryloyloxyethyl)acid phosphate,
diphenyl(2-acryloyloxyethyl)phosphate,
diphenyl(2-methacryloyloxyethyl)phosphate,
phenyl(2-acryloyloxyethyl)phosphate,
acid phosphooxyethyl methacrylate,
methacroyl oxyethyl acid phosphate monoethanol amine salt,
3-chloro-2-acid phosphoxypropyl methacrylate,
acid phosphooxy polyoxyethylene glycol monomethacrylate,
acid phosphooxypolyoxypropylene glycol methacrylate,
(meth)acryloyloxyethyl acid phosphate,
(meth)acryloyloxypropyl acid phosphate,
(meth)acryloyloxy-2-hydroxypropyl acid phosphate,
(meth)acryloyloxy-3-hydroxypropyl acid phosphate,
(meth)acryloyloxy-3-chloro-2-hydroxypropyl acid Phosphate,
allyl alcohol acid phosphate,
4-(acrylamide)benzylphosphonate,
4-(methacrylamide)benzylphosphonate,
tetraethyl 2,2'-N-acryloyliminobis (ethylphosphonate),
tetraethyl 2,2'-N-methacryloyliminobis (ethylphosphonate),
diethyl 3-(N-acrylamido)propylphosphonate,
diethyl 3-(N-methacrylamido)propylphosphonate,
diethyl 3-(N-acrylamido)ethylphosphonate,
diethyl 3-(N-methacrylamido)ethylphosphonate,
ethylene oxide-modified phenoxylated phosphoric (meth)acrylates,
ethylene oxide-modified butoxylated phosphoric (meth)acrylates,
ethylene oxide-modified octyloxylated phosphoric (meth)acrylates,
ethylene oxide-modified phosphoric di(meth)acrylates,
ethylene oxide-modified phosphoric tri(meth)acrylates,
5-methacryloxypentyl 3-phosphonopropionate,
6-methacryloxyhexyl 3-phosphonopropionate,
6-acryloxyhexyl 3-phosphonopropionate,
10-methacryloxydecyl 3-phosphonopropionate,
(3-acryloyloxypropyl)buthylphosphinic acid,
(3-methacryloyloxypropyl)octylphosphinic acid,
3-acryloyloxypropylphosphonic acid, and
3-methacryloyloxypropylphosphonic acid.

The phosphoric acid derivative may be used alone or in combination with two or more (for example, as a mixture).

The phosphoric acid derivative is commercially available as bis[2-methacryloyloxy)ethyl]phosphate or Phosphoric acid 2-hydroxyethyl methacrylate ester from SIGMA-ALDRICH, as LIGHT ESTER P-1M, LIGHT ESTER P-2M, or LIGHT ACRYLATE P-1A(N) from KYOEISHA CHEMICAL Co., Ltd. or as KAYAMER PM-2 or KAYAMER PM-21 from NIPPON KAYAKU Co., Ltd.

The composition for forming the phosphate binding layer further comprises an active energy curing initiator and/or a solvent.

As the active energy curing initiator, for example, a compound is used which generates a radical or cation only by irradiation of an electromagnetic wave of 350 nm or less, that is, an ultraviolet light, an electron beam, an X-ray, a γ-ray, etc., and functions as a catalyst initiating curing (cross-linking reaction) of a curable moiety (for example, carbon-carbon double bond) in the compound of the composition, usually a compound which generates a radical or cation, in particular a radical by irradiation of ultraviolet.

The active energy curing initiator in the composition of the present invention can be appropriately selected depending on a type of the phosphoric acid derivative, a type or irradiation intensity of an active energy ray used (range of wavelength, etc.). When the general active energy curing initiator is used, examples of the initiator include, for example, the following compounds.

Acetophenones
acetophenone, chloroacetophenone, diethoxyacetophenone, hydroxyacetophenone, α-aminoacetophenone, hydroxypropiophenone, 2-methyl-1-[4-(methylthio)phenyl]-2-morpholinopropan-1-one, and the like.

Benzoins
benzoin, benzoin methyl ether, benzoin ethyl ether, benzoin isopropyl ether, benzoin isobutyl ether, benzyl dimethyl ketal, and the like.

Benzophenones
benzophenone, benzoyl benzoate, methyl benzoyl benzoate, 4-phenyl benzophenone, hydroxy benzophenone, hydroxy-propyl benzophenone, acrylated benzophenone, Michler's ketone, and the like.

Thioxanthones
thioxanthone, chlorothioxanthone, methylthioxanthone, diethylthioxanthone, dimethylthioxanthone, and the like.

Others
benzyl, α-acyloxime ester, acylphosphine oxide, glyoxy ester, 3-ketocoumarin, 2-ethylanthraquinone, camphorquinone, anthraquinone, and the like.

These active energy curing initiators may be used alone or may be used in combination of two or more.

The active energy curing initiator is contained at 0.01-30 parts by mass, preferably 0.1-20 parts by mass with respect to the total 100 parts by mass of phosphoric acid derivative, but are not limited thereto.

As the solvent, for example, the following solvent is used: a cellosolve solvent such as methyl cellosolve, ethyl cellosolve, methyl cellosolve acetate, ethyl cellosolve acetate; an ester solvent such as diethyl oxalate, ethyl pyruvate, ethyl-2-hydroxy butyrate, ethyl acetoacetate, ethyl acetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, ethyl 2-hydroxyisobutyrate; a propylene glycol solvent such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether; a ketone solvent such as acetone, methyl ethyl ketone, methyl isobutyl ketone, 2-hexanone, cyclohexanone, methyl amino ketone, 2-heptanone; an alcohol solvent such as methanol, ethanol, propanol, isopropanol, butanol, diacetone alcohol; an aromatic hydrocarbon such as toluene, xylene, and the like.

The fluoropolyether layer is formed of a fluoropolyether compound having a fluoropolyether group and a carbon-carbon double bond. The fluoropolyether compound may be used as a composition comprising the fluoropolyether compound having a fluoropolyether group and a carbon-carbon double bond.

The fluoropolyether group comprises a monovalent fluoropolyether group and a divalent fluoropolyether group.

In one embodiment, a monovalent fluoropolyether group is a group of: Rf-PFPE-.

In one embodiment, a divalent fluoropolyether group is -PFPE-.

In the formulae:

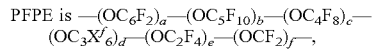

PFPE is —(OC$_6$F$_2$)$_a$—(OC$_5$F$_{10}$)$_b$—(OC$_4$F$_8$)$_c$—(OC$_3$X$^f_6$)$_d$—(OC$_2$F$_4$)$_e$—(OCF$_2$)$_f$—, $X^f$ is a hydrogen atom, a fluorine atom, or a chlorine atom; and a, b, c, d, e and f are each independently an integer of 0-200, the sum of a, b, c, d, e and f is at least one, and the occurrence order of the respective repeating units in parentheses with the subscript a, b, c, d, e or f is not limited in the formula.

Rf is each independently at each occurrence an alkyl group having 1-16 carbon atoms which may be substituted by one or more fluorine atoms.

PFPE is each independently —(OC$_6$F$_{12}$)$_a$—(OC$_5$F$_{10}$)$_b$—(OC$_4$F$_8$)$_c$—(OC$_3$X$^f_6$)$_d$—(OC$_2$F$_4$)$_e$—(OCF$_2$)$_f$—. Herein, a, b, c, d, e and f are each independently 0 or an integer of 1 or more. The sum of a, b, c, d, e and f is 1 or more. $X^f$ is a hydrogen atom, a fluorine atom, or a chlorine atom, preferably a fluorine atom, or a chlorine atom, more preferably a fluorine atom. Preferably, a, b, c, d, e and f are each independently an integer of 0 or more and 200 or less, for example an integer of 1 or more and 200 or less, more preferably each independently an integer of 0 or more and 100 or less. The sum of a, b, c, d, e and f is preferably 5 or more, more preferably 10 or more, for example 10 or more and 100 or less. The occurrence order of the respective repeating units in parentheses with the subscript a, b, c, d, e or f is not limited in the formula.

Among these repeating units, the —(OC$_6$F$_{12}$)— group may be any of —(OCF$_2$CF$_2$CF$_2$CF$_2$CF$_2$CF$_2$)—, —(OCF(CF$_3$)CF$_2$CF$_2$CF$_2$CF$_2$)—, —(OCF$_2$CF(CF$_3$)CF$_2$CF$_2$CF$_2$)—, —(OCF$_2$CF$_2$CF(CF$_3$)CF$_2$CF$_2$)—, —(OCF$_2$CF$_2$CF$_2$CF(CF$_3$)CF$_2$)—, —(OCF$_2$CF$_2$CF$_2$CF$_2$CF(CF$_3$))—, and the like, preferably —(OCF$_2$CF$_2$CF$_2$CF$_2$CF$_2$CF$_2$)—, the —(OC$_5$F$_{10}$)— group may be any of —(OCF$_2$CF$_2$CF$_2$CF$_2$CF$_2$)—, —(OCF(CF$_3$)CF$_2$CF$_2$CF$_2$)—, —(OCF$_2$CF(CF$_3$)CF$_2$CF$_2$)—, —(OCF$_2$CF$_2$CF(CF$_3$)CF$_2$)—, —(OCF$_2$CF$_2$CF$_2$CF(CF$_3$))—, and the like, preferably —(OCF$_2$CF$_2$CF$_2$CF$_2$CF$_2$)—, the —(OC$_4$F$_8$)— group may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))—, preferably —(OCF$_2$CF$_2$CF$_2$CF$_2$)—. The —(OC$_3$F$_6$)— group may be any of —(OCF$_2$CF$_2$CF$_2$)—, —(OCF(CF$_3$)CF$_2$)— and —(OCF$_2$CF(CF$_3$))—, preferably —(OCF$_2$CF$_2$CF$_2$)—. The —(OC$_2$F$_4$)— group may be any of —(OCF$_2$CF$_2$)— and —(OCF(CF$_3$))—, preferably —(OCF$_2$CF$_2$)—.

In one embodiment, PFPE is —(OC$_3$F$_6$)$_d$— wherein d is an integer of 1 or more and 200 or less, preferably 5 or more and 200 or less, more preferably 10 or more and 200 or less, preferably —(OCF$_2$CF$_2$CF$_2$)$_d$— wherein d is an integer of 1 or more and 200 or less, preferably 5 or more and 200 or less, more preferably 10 or more and 200 or less, or —(OCF(CF$_3$)CF$_2$)$_d$— wherein d is an integer of 1 or more and 200 or less, preferably 5 or more and 200 or less, more preferably 10 or more and 200 or less, more preferably —(OCF$_2$CF$_2$CF$_2$)$_d$— wherein d is an integer of 1 or more and 200 or less, preferably 5 or more and 200 or less, more preferably 10 or more and 200 or less.

In another embodiment, PFPE is —(OC$_4$F)$_c$—(OC$_3$F$_6$)$_d$—(OC$_2$F$_4$)$_e$(OCF$_2$)$_f$— wherein c and d are each independently an integer of 0 or more and 30 or less, e and f are each independently an integer of 1 or more and 200 or less, preferably 5 or more and 200 or less, more preferably 10 or more and 200 or less, and the occurrence order of the respective repeating units in parentheses with the subscript c, d, e or f is not limited in the formula; preferably —(OCF$_2$CF$_2$CF$_2$CF$_2$)$_c$—(OCF$_2$CF$_2$CF$_2$)$_d$—(OCF$_2$CF$_2$)$_e$(OCF$_2$)$_f$. In one embodiment, PFPE may be —(OC$_2$F$_4$)$_e$(OCF$_2$)$_f$ wherein e and f are each independently an integer of 1 or more and 200 or less, preferably 5 or more and 200 or less, more preferably 10 or more and 200 or less, and the occurrence order of the respective repeating units in parentheses with the subscript e or f is not limited in the formula.

In further another embodiment, PFPE is a group of —(R$^{21}$—R$^{22}$)$_h$—. In the formula, R$^{21}$ is OCF$_2$ or OC$_2$F$_4$, preferably OC$_2$F$_4$. That is, preferably PFPE is a group of —(OC$_2$F$_4$—R$^{22}$)$_h$—. In the formula, R$^{22}$ is a group selected from OC$_2$F$_4$, OC$_3$F$_6$ and OC$_4$F, or a combination of 2 or 3 groups independently selected from these groups. Examples of the combination of 2 or 3 groups independently selected from OC$_2$F$_4$, OC$_3$F$_6$ and OC$_4$F$_8$ include, but not limited to, for example, —OC$_2$F$_4$OC$_3$F$_6$—, —OC$_2$F$_4$OC$_4$F$_8$—, —OC$_3$F$_6$OC$_2$F$_4$—, —OC$_3$F$_6$OC$_3$F$_6$—, —OC$_3$F$_6$OC$_4$F$_8$—, —OC$_4$F$_8$OC$_4$F$_8$—, —OC$_4$F$_8$OC$_3$F$_6$—, —OC$_4$F$_8$OC$_2$F$_4$—, —OC$_2$F$_4$ OC$_2$F$_4$OC$_3$F$_6$—, —OC$_2$F$_4$OC$_2$F$_4$OC$_4$F$_8$—, —OC$_2$F$_4$OC$_3$F$_6$OC$_2$F$_4$—, —OC$_2$F$_4$OC$_3$F$_6$OC$_3$F$_6$—, —OC$_2$F$_4$ OC$_4$F$_8$OC$_2$F$_4$—, —OC$_3$F$_6$OC$_2$F$_4$OC$_2$F$_4$—, —OC$_3$F$_6$OC$_2$F$_4$OC$_3$F$_6$—, —OC$_3$F$_6$OC$_3$F$_6$OC$_2$F$_4$—, —OC$_4$F$_8$ OC$_2$F$_4$OC$_2$F$_4$—, and the like. h is an integer of 2-100, preferably an integer of 2-50. In the above-mentioned formula, OC$_2$F$_4$, OC$_3$F$_6$ and OC$_4$F$_8$ may be straight or branched, preferably straight. In this embodiment, PFPE is preferably —(OC$_2$F$_4$—OC$_3$F$_6$)$_h$— or —(OC$_2$F$_4$—OC$_4$F$_8$)$_h$—

Rf is an alkyl group having 1-16 carbon atoms which may be substituted by one or more fluorine atoms.

The "alkyl group having 1-16 carbon atoms" in the alkyl having 1-16 carbon atoms which may be substituted by one or more fluorine atoms may be straight or branched, and preferably is a straight or branched alkyl group having 1-6 carbon atoms, in particular 1-3 carbon atoms, more preferably a straight alkyl group having 1-3 carbon atoms.

Rf is preferably an alkyl having 1-16 carbon atoms substituted by one or more fluorine atoms, more preferably a CF$_2$H—C$_{1-15}$ fluoroalkylene group, more preferably a perfluoroalkyl group having 1-16 carbon atoms.

The perfluoroalkyl group having 1-16 carbon atoms may be straight or branched, and preferably is a straight or branched perfluoroalkyl group having 1-6 carbon atoms, in particular 1-3 carbon atoms, more preferably a straight perfluoroalkyl group having 1-3 carbon atoms, specifically —$CF_3$, —$CF_2CF_3$ or —$CF_2CF_2CF_3$.

In a preferable embodiment, the fluoropolyether group is a perfluoropolyether group.

In one embodiment, the perfluoropolyether may have the formula:

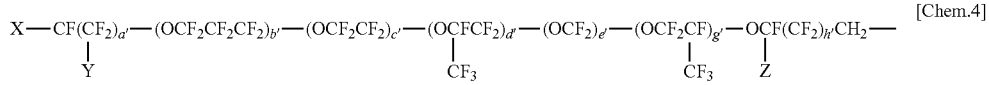
[Chem.4]

wherein:
X is F or —$CH_2OH$,
Y and Z are independently selected from F, and trifluoromethyl,
a' is an integer of 1-16, b' is an integer of 0-200, c' is an integer of 0-5, d' is an integer of 0-200, e' is an integer of 0-200, f is an integer of 0-200, g' is an integer of 0-200, and h' is an integer of 0-16. Any value within these ranges is explicitly supported. For example, a' may be any one of 1, 2, 3, 4, 5, 6, 7, 8, 9, 10, 11, 12, 13, 14, 15, and 16. In a specific embodiment, a' is an integer of 2, b' is more than 0, h' is 1, and each of X, Y, and Z is F. In further specific embodiments, each of c', d', e', and g' are 0. Furthermore, this general formula is not meant to imply any specific order of the monomeric building blocks in that each monomeric building block can exist in random and/or block-like order within the perfluoropolyether.

In one embodiment, the fluoropolyether compound is a compound of the formula;

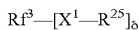

wherein:
$Rf^3$ is a fluoropolyether group,
$X^1$ is a linker,
$R^{25}$ is a (meth)acryl group, or —COCF=$CH_2$, and
δ is 1 or 2.

$X^1$ is preferably a divalent group selected from an alkylene, arylene, heteroalkylene, or combinations thereof and an optional divalent group selected from carbonyl, carbonyloxy, carbonylimino, sulfonamido, or combinations thereof. $X^1$ may be unsubstituted or substituted with an alkyl, aryl, halo, or combinations thereof. $X^1$ typically has no more than 30 carbon atoms. In one embodiment, $X^1$ has no more than 20 carbon atoms, no more than 10 carbon atoms, no more than 6 carbon atoms, or no more than 4 carbon atoms. For example, $X^1$ may be an alkylene, an alkylene substituted with an aryl group, or an alkylene in combination with an arylene.

In one embodiment, the fluoropolyether compound may be a compound described in U.S. Pat. No. 6,906,115, which is incorporated herein by reference in its entirety to teach such compounds. The fluoropolyether compound may be a compound obtained by reacting:

(A) a triisocyanate prepared by trimerizing a diisocyanate, with (B) a combination of at least two active hydrogen-containing compounds wherein the component (B) comprises:

(B-1) a fluoropolyether having at least one active hydrogen, and (B-2) a monomer having an active hydrogen atom and a carbon-carbon double bond.

In other words, the fluoropolyether compound may be a compound having a carbon-carbon double bond obtained by reacting component (A) with component (B), that is, by reacting an isocyanate group (a —NCO group) present in component (A) with an active hydrogen containing group, for example a hydroxy group, present in (B1) a perfluoropolyether having an active hydrogen and (B2) a monomer having an active hydrogen and a carbon-carbon double bond.

The reaction of the triisocyanate (A) with the component (B), that is, the reaction of an NCO group present in the triisocyanate (A) with an active hydrogen atom present in the component (B) gives a fluoropolyether-containing compound having at least one carbon-carbon double bond. The fluoropolyether compound used in the present invention is preferably the fluoropolyether-containing compound having at least one carbon-carbon double bond. The equivalent ratio of the NCO group present in the triisocyanate (A) to the active hydrogen atom present in the component (B) may be 1, at least 1, particularly 1.

For example, the reaction of the NCO group present in the triisocyanate (A) with the active hydrogen atom present in the components (B-1) and (B-2) can give a fluoropolyether-containing compound having at least one carbon-carbon double bond. The components (B-1) and (B-2) may be simultaneously added to the triisocyanate (A), or the components (B-1) and (B-2) may be sequentially added to the triisocyanate (A). The total amount of the active hydrogen possessed by the component (B-1) and the active hydrogen possessed by the component (B-2) may be 3 mol, relative to 1 mol of the triisocyanate (A). The amount of the component (B-1) may have a lower limit of 0.0001 mol, for example, 0.01 mol, particularly 0.1 mol, and an upper limit of 2 mol, for example, 1.5 mol, particularly 1.0 mol, based on 1 mol of the triisocyanate (A). The amount of component (B-1) may be, for example, from 0.0001 to 2 mol, particularly from 0.01 to 1.2 mol, based on 1 mol of the triisocyanate (A). The amount of the component (B-2) may have a lower limit of 1 mol, for example, 1.2 mol, particularly 1.5 mol and an upper limit of 2.5 mol, for example, 2.0 mol, particularly 1.8 mol, based on 1 mol of the triisocyanate (A). The amount of the component (B-2) may be, for example, from 1.0 to 2.5 mol, particularly from 1.2 to 2.0 mol, based on 1 mol of the triisocyanate (A).

The component (B) may further contain (B-3) a third compound having an active hydrogen atom. The fluoropolyether-containing compound having at least one carbon-carbon double bond may be obtained by reacting the component (A) with the components (B-1), (B-2) and (B-3). The components (B-1), (B-2) and (B-3) may be simultaneously added to the triisocyanate (A), or the components (B-1), (B-2) and (B-3) may be sequentially (the addition order is not limited to the description order.) added to the triisocyanate (A).

In some embodiments, at least 1 mol of the component (B-2) is reacted with the isocyanate group present in the triisocyanate (A), and the remaining NCO group is reacted with the component (B-1) and the component (B-3). The total amount of the active hydrogen possessed by the component (B-1), (B-2) and (B-3) is preferably at least 3 mol, particularly 3 mol, relative to 1 mol of the triisocyanate (A).

In one embodiment, the fluoropolyether having carbon-carbon double bond and raw materials for obtaining the fluoropolyether having carbon-carbon double bond (that is, the components (A) and (B)) may be homogeneously dispersed in a diluent (for example, a solvent and an acrylic monomer).

In one embodiment, the triisocyanate (A) may be prepared by trimerizing a diisocyanate. Examples of diisocyanate used for preparing the triisocyanate (A) include diisocyanates having aliphatically bonded isocyanate groups, for example, hexamethylene diisocyanate, isophorone diisocyanate, xylylene diisocyanate, hydrogenated xylylene diisocyanate and dicyclohexylmethane diisocyanate; and diisocyanates having aromatically bonded isocyanate groups, for example, tolylene diisocyanate, diphenylmethane diisocyanate, polymethylenepolyphenyl polyisocyanate, tolidine diisocyanate and naphthalene diisocyanate.

[Chem.5]

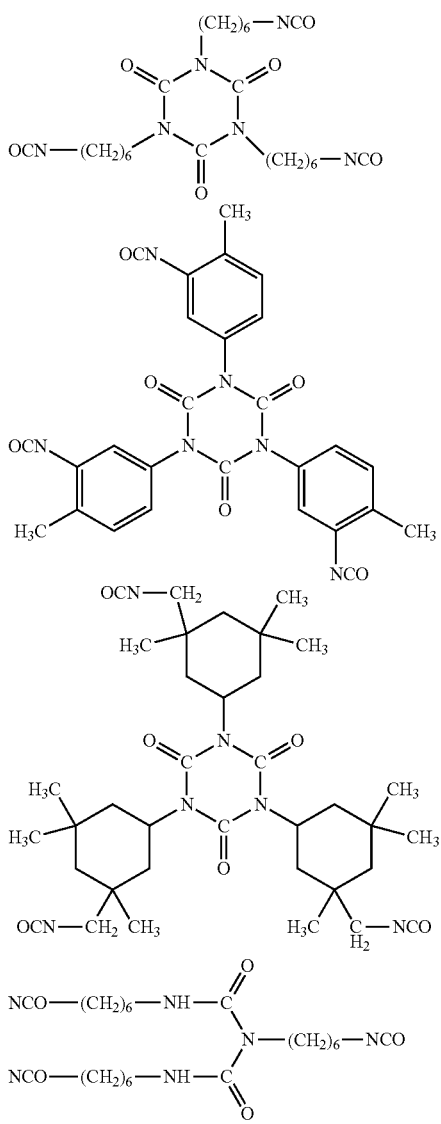

The component (B) may comprise (B-1) a fluoropolyether having at least one active hydrogen atom (for example, an active hydroxyl group), (B-2) a monomer having an active hydrogen atom and a carbon-carbon double bond, and (B-3) optionally present, a compound having an active hydrogen atom (for example, an active hydroxyl group). The active hydrogen atom is present in an active hydrogen-containing group such as an active hydroxyl group.

The fluoropolyether (B-1) is a compound having one hydroxyl group at one molecular end or one hydroxyl group at each of both ends, in addition to a fluoropolyether group.

The fluoropolyether having an active hydrogen in component (B-1) has a number average molecular weight of 500-12,000, preferably 1,000-10,000, more preferably 1,500-8,000, but not particularly limited thereto.

Preferably, component (B-1) may be at least one compound of any one of the following general formulae (B1-i) and (B1-ii):

$$Rf\text{-PFPE-}R^{26}\text{—}CH_2OH \qquad (B1\text{-}i)$$

$$HOCH_2\text{—}R^{26}\text{-PFPE-}R^{26}\text{—}CH_2OH \qquad (B1\text{-}ii).$$

wherein:
Rf and PFPE are the same as defined above,
$R^{26}$ is each independently a group of the following formula:

$$-(Y)_f(CF_2)_g-(CH_2)_h$$

wherein, Y is a divalent polar group.

In the formula, examples of the divalent polar group include, but are not particularly limited to, —COO—, —OCO—, —CONH—, —OCH$_2$CH(OH)CH$_2$—, —CH$_2$CH(OH)CH$_2$O—, —COS—, —SCO—, and —O—, preferably it is —COO—, —CONH—, —CH$_2$CH(OH)CH$_2$O— or —O—. In this formula, f, g and h are each independently an integer of 0-50, preferably 0-20, for example an integer of 1-20, the sum of f, g and h is at least one, preferably 1-10. More preferably, f, g and h are an integer of 0-2, and further preferably, f is 0 or 1, g is 2, and h is 0 or 1. The occurrence order of the respective repeating units in parentheses with the subscript f, g or h is not limited in the formula.

In a preferable embodiment, component (B-1) is a compound of the formula (B1-i).

$$Rf\text{-PFPE-}R^{26}\text{—}CH_2OH \qquad (B1\text{-}i)$$

The monomer (B-2) having active hydrogen and carbon-carbon double bond may be a (meth)acrylate ester or vinyl monomer-having active hydrogen, particularly a hydroxyl group. Examples of the monomer (B-2) include the following:

$$HO(CH_2CH_2)_iOCO(R)C=CH_2$$

wherein a hydrogen atom, a chlorine atom, a fluorine atom, or an alkyl group having 1-10 carbon atoms which may be substituted by a fluorine atom, and i is 2-10, for example, 2-hydroxyethyl(meth)acrylate, 4-hydroxybutyl (meth)acrylate;

$$CH_3CH(OH)CH_2OCO(R)C=CH_2$$

wherein R is a hydrogen atom, a chlorine atom, a fluorine atom, or n alkyl group having 1-10 carbon atoms which may be substituted by a fluorine atom, for example, 2-hydroxypropyl(meth)acrylate;

$$CH_3CH_2CH(OH)CH_2OCO(R)C=CH_2$$

wherein R is a hydrogen atom, a chlorine atom, a fluorine atom, or an alkyl group having 1-10 carbon atoms which may be substituted by a fluorine atom, for example, 2-hydroxybutyl (meth)acrylate;

$$C_6H_5OCH_2CH(OH)CH_2OCO(R)C=CH_2$$

wherein R is a hydrogen atom, a chlorine atom, a fluorine atom, or an alkyl group having 1-10 carbon atoms which may be substituted by a fluorine atom, for example, 2-hydroxy-3-phenoxypropyl (meth)acrylate;

HOCH$_2$C(CH$_2$OCO(R)C=CH$_2$)$_3$ wherein R is a hydrogen atom, a chlorine atom, a fluorine atom, or an alkyl group having 1-10 carbon atoms which may be substituted by a fluorine atom, for example, pentaerythritol triacrylate;

C(CH$_2$OCO(R)C=CH$_2$)$_3$CH$_2$OCH$_2$C(CH$_2$OCO(R)C=CH$_2$)$_2$CH$_2$OH wherein R is a hydrogen atom, a chlorine atom, a fluorine atom, or an alkyl group having 1-10 carbon atoms which may be substituted by a fluorine atom, for example, dipentaerythritol polyacrylate;

HOCH$_2$CH$_2$OCOC$_6$H$_5$OCOCH$_2$CH$_2$OCO(R)C=CH$_2$ wherein R is a hydrogen atom, a chlorine atom, a fluorine atom, or an alkyl group having 1-10 carbon atoms which may be substituted by a fluorine atom, for example, 2-acryloyloxyethyl-2-2-hydroxyethyl phthalate;

H(OCH$_2$CH$_2$)$_n$OCO(R)C=CH$_2$ wherein n is 1-30, and R is a hydrogen atom, a chlorine atom, a fluorine atom, or an alkyl group having 1-10 carbon atoms which may be substituted by a fluorine atom, for example, poly(ethylene glycol) acrylate;

H(OCH(CH$_3$)CH$_2$)$_n$OCO(R)C=CH$_2$ wherein n is 1-30, and R is a hydrogen atom, a chlorine atom, a fluorine atom, or an alkyl group having 1-10 carbon atoms which may be substituted by a fluorine atom, for example, poly(propylene glycol) acrylate;
an allylalcohol;

HO(CH$_2$)$_k$CH=CH$_2$ wherein k is 2-20;

(CH$_3$)$_3$SiCH(OH)CH=CH$_2$; and styrylphenol.

The compound (B-3) having active hydrogen may be a compound which has neither a fluoropolyether group nor a carbon-carbon double bond and which has at least one active hydrogen. Examples of the compound (B-3) include the following:

a monohydric alcohol comprising a linear or branched hydrocarbon having 1 to 16 carbon atoms; 2,3-epoxypropanol; a secondary amine comprising a linear or branched hydrocarbon having 1 to 16 carbon atoms; a secondary amine containing an aromatic group; an Rf alcohol; Q(CF$_2$)$_l$(CH=CH)$_m$(CHI)$_n$(CH$_2$)$_o$OH wherein Q is a hydrogen atom, a fluorine atom or a (CF$_3$CF) group, l is an integer of 1 to 10, m and n is an integer of 0 to 1, and o is an integer of 1 to 10; a polyalkylene glycol monoester; for example, R(OCH$_2$CH$_2$)$_p$OH, R(OCH$_2$CH$_2$CH$_2$)$_q$OH wherein R is a linear or branched hydrocarbon, an acetyl group, or an alkylphenoxy group having 1 to 16 carbon atoms, and p and q are an integer of 1 to 20; an aromatic alcohol; and a siloxane compound having active hydrogen.

The siloxane compound having active hydrogen has a number average molecular weight of 100-20,000, preferably 500-15,000, more preferably 800-12,000, but not particularly limited thereto.

In one embodiment, the siloxane compound having active hydrogen may be (CH$_3$)$_3$ Si(CH$_2$)$_s$OH wherein s is an integer of 1 to 20 or a compound of the following formula:

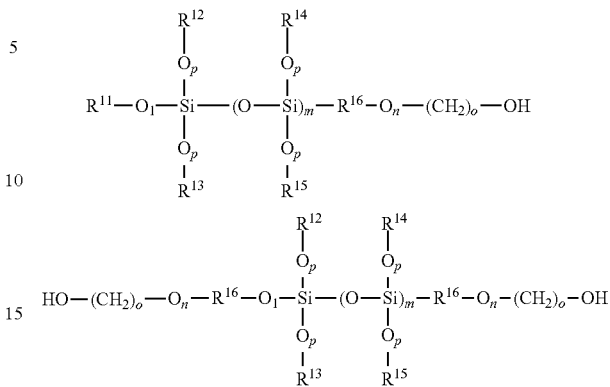

wherein $R^{11}$, $R^{12}$, $R^{13}$, $R^{14}$ and $R^{15}$ are each independently an alkyl group or an aryl group.

Examples of the alkyl group include, but are not particularly limited to, an alkyl group having 1-10 carbon atoms, and a cycloalkyl group having 3-20 carbon atoms, preferably an alkyl group having 1-6 carbon atoms. The alkyl group may be straight or branched, preferably straight. A preferable example is, for $R^1$, an n-butyl group, and for $R^{12}$—$R^{15}$, a methyl group.

Examples of the aryl group include, but are not particularly limited to, an aryl group having 6-20 carbon atoms. The aryl group may contain 2 or more rings. Preferable aryl group is a phenyl group.

The alkyl group and the aryl group may optionally contain a heteroatom, for example, a nitrogen atom, an oxygen atom or a sulfur atom in its molecular chain or ring.

Furthermore, the alkyl group and the aryl group may be optionally substituted by one or more substituents selected from a halogen; a $C_{1-6}$ alkyl group, a $C_{26}$ alkenyl group, a $C_{26}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl, which may be substituted by one or more halogens.

In the above formulae, $R^{16}$ represents a divalent organic group. Preferably, $R^{16}$ is —(CH$_2$)$_r$— wherein r is an integer of 1-20, preferably an integer of 1-10.

In the above formulae, l and n are each independently 0 or 1; m is an integer of 1-500, preferably an integer of 1-200, more preferably an integer of 5-150; o is an integer of 0-20, for example an integer of 1-20, and p is 0 or 1.

Examples of the specific compound of the above formulae include for example a compound of the formula:

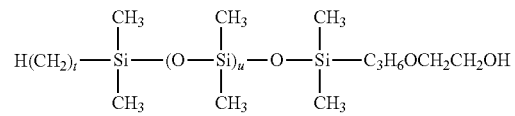

t = 1-20
u = 1-500

-continued

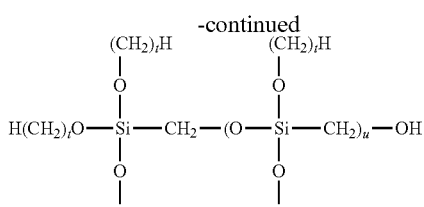

t = 1-6
u = 1-10

The compound (B-3) having active hydrogen may be a siloxane compound having an amino group as an active hydrogen containing group. Example of such compound includes, but is not particularly to, a compound of the following formula:

[(CH$_3$)$_3$]NH,

[Chem.8]

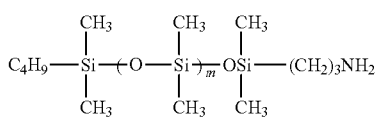

wherein m is an integer of 1-500, preferably an integer of 1-200, more preferably an integer of 5-150,

[Chem.9]

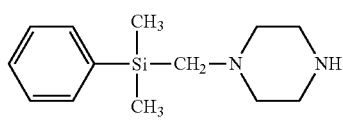

and

The reaction for preparing the fluoropolyether-containing compound having carbon-carbon double bond may be as follows:

[Chem.10]

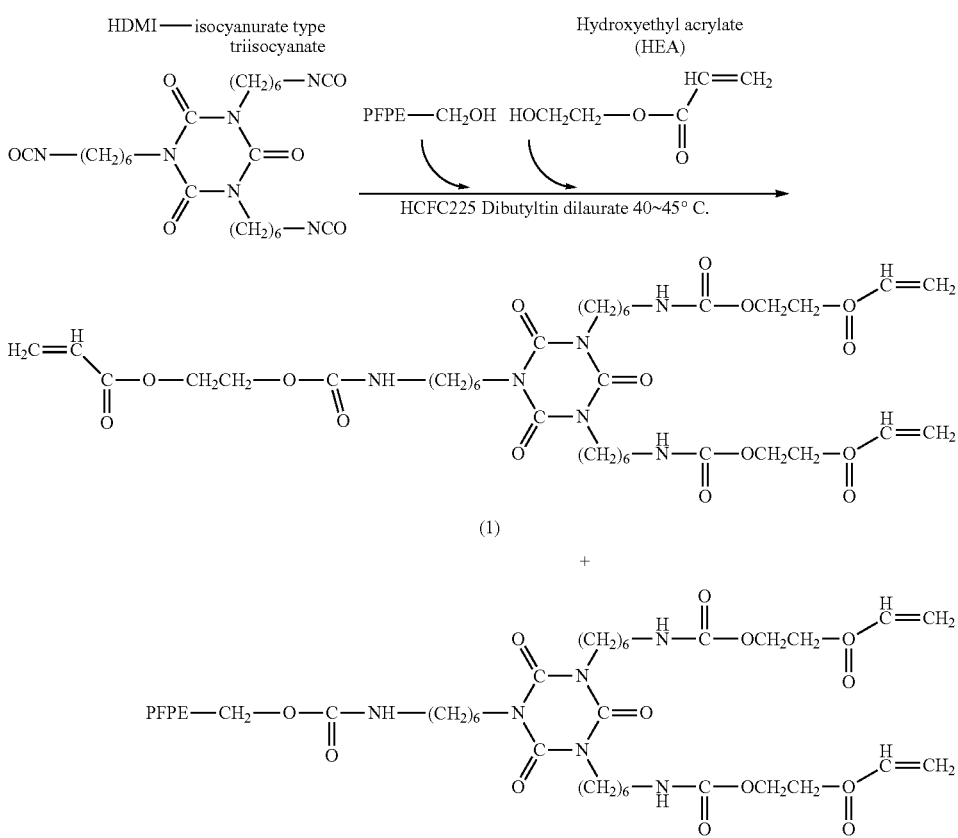

(2)
Isocyanurate type PFPE urethane acrylate

Specific examples of the fluoropolyether-containing compound having carbon-carbon double bond obtained by using the third component (that is, the component (B-3)) include a compound of the following chemical formula

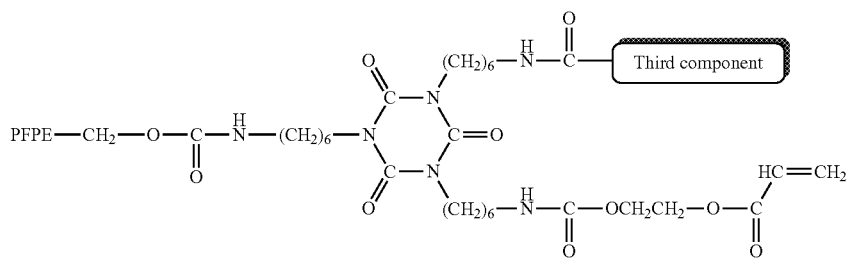

[Chem.11]

The fluoropolyether-containing compound having carbon-carbon double bond may be the compound of the above formula, wherein a first isocyanate group projecting from an isocyanurate ring reacts with the component (B-1), a second isocyanate group reacts with the component (B-2), and a third isocyanate group reacts with the component (B-3).

fluoropolyether-containing compound molecule which bonds to one molecule of the component (B-1), and/or a fluoropolyether-containing compound molecule which bond to two molecules of the component (B-1). In the mixture of the fluoropolyether-containing compounds, the amount of the fluoropolyether-containing compound bonding to one molecule of the component (B-1) may have a lower limit of 0.0001 mol, for example, 0.01 mol, particularly 0.1 mol, based on 1 mol of the total fluoropolyether-containing compounds. The mixture of the fluoropolyether-containing

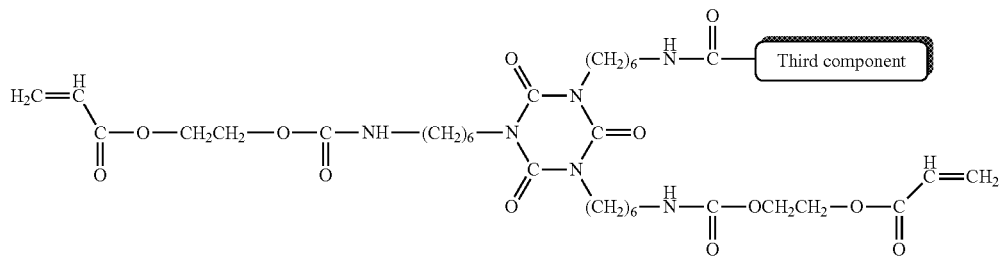

[Chem.12]

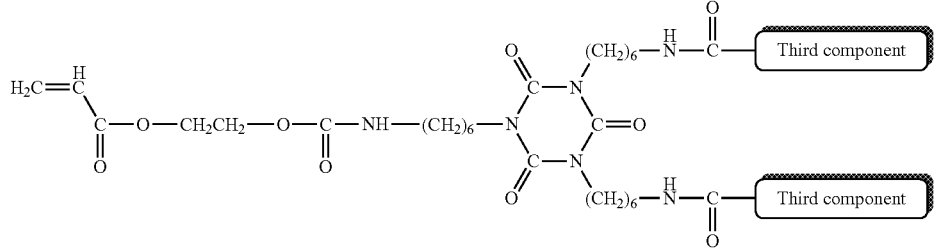

[Chem.13]

In one embodiment, in the fluoropolyether-containing compound having carbon-carbon double bond, each isocyanate group projecting from the isocyanurate ring may react with only one molecule of each of the components (B-1), (B-2) and (B-3), and the reacted components (B-1), (B-2) and (B-3) make no reaction with any other compound to form an end.

The fluoropolyether-containing compound having carbon-carbon double bond is a compound having at least one molecule of the component (B-2) bonded to one isocyanate group. The remaining two isocyanate groups may react with and bond to any of the components (B-1), (B-2) and (B-3). The fluoropolyether-containing compound can be a mixture wherein different type of the components (B-1), (B-2) and (B-3) bond to the remaining two isocyanate groups.

The mixture of the fluoropolyether-containing compounds may contain a fluoropolyether-containing compound molecule which does not bond to the component (B-1), a compounds may contain a fluoropolyether-containing compound bonded to 2 molecules of the component (B-1), the amount of which has an upper limit of 1 mol, for example, 0.8 mol, particularly 0.5 mol, based on 1 mol of the total fluoropolyether-containing compounds. The mixture of the fluoropolyether-compound may not contain the fluoropolyether-containing compound bonding to 2 molecules of the component (B-1).

The mixture of the fluoropolyether-containing compounds may contain a fluoropolyether-containing compound molecule not bonded to the component (B-3), a fluoropolyether-containing compound molecule bonded to one molecule of the component (B-3), and/or a fluoropolyether-containing compound molecule bonded to two molecules of the component (B-3). The amount of the fluoropolyether-containing compound molecule bonded to one molecule of the component (B-3) may have an upper limit of 1 mol, for example, 0.8 mol, particularly 0.5 mol, based on 1 mol of the total perfluoropolyether-containing compounds. The mixture of the fluoropolyether-containing compounds may contain the fluoropolyether-containing compound bonded to 2 molecules of the component (B-3), the amount of which has an upper limit of 0.8 mol, for example, 0.5 mol, particularly 0.3 mol, based on 1 mol of the total fluoropolyether-containing compounds.

The composition for forming the fluoropolyether layer further comprises an active energy curing initiator and/or a solvent.

The active energy curing initiator is the same as the active energy curing initiator for the composition for forming the phosphate binding layer.

As the solvent, the fluorine-containing organic solvent and the fluorine-free organic solvent can be used. As the solvent, for example, the following solvent is used: perfluorohexane, perfluorooctane, perfluoro-dimethyl cyclohexane, perfluorodecalin, perfluoroalkyl ethanol, perfluorobenzene, perfluorotoluene, perfluoroalkylamines (Fluorinert (trade name), etc.), perfluoroalkyl ethers, perfluorobutyl tetrahydrofuran, polyfluoro-aliphatic hydrocarbons (ASAHIKLIN AC6000 (trade name)), hydrochlorofluorocarbons (ASAHIKLIN AK-225 (trade name), etc.), hydrofluoroethers (Novec (trade name), HFE-7100 (trade name), etc.), 1,1,2,2,3,3,4-heptafluorocyclopentane ((ZEORORA H (trade name), etc.), fluorine-containing alcohols, perfluoroalkyl bromide, perfluoroalkyl iodide, perfluoropolyether (Krytox (trade name), Demnum (trade name), Fomblin (trade name), etc.), 1,3-bistrifluoromethyl benzene, 2-(perfluoroalkyl) ethyl methacrylate, 2-(perfluoroalkyl)ethyl acrylate, perfluoroalkyl ethylene, Freon 134a, and hexafluoropropene oligomers; acetone, methyl ethyl ketone, methyl isobutyl ketone, cyclohexanone, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethylformamide, dimethyl sulfoxide, acetonitrile, benzonitrile, butanol, 1-propanol, 2-propanol, ethanol, methanol, and diacetone alcohol.

These solvents may be used alone or may be used in combination of two or more.

The coating may be generally applied by a method involving covalently bonding the metal or metal oxide surface to the phosphoric acid derivative and covalently bonding the phosphoric acid derivative to the fluoropolyether group. These basic steps can be performed in any order. Reacting the phosphoric acid derivative to the metal first has the advantage of reducing or eliminating the number of reactions than can be formed between the phosphoric acid derivatives, potentially blocking reactive sites. In one embodiment, the method comprises covalently bonding the metal or metal oxide surface to the metal binding group to form a monolayer on the metal or metal oxide surface, and subsequently exposing the monolayer to the molecule comprising in the PFPE group in the presence of an initiator.

In this context "covalently bonding" a first group to a second group encompasses reactions that covalently bond a molecule that includes the first group to a molecule that includes the second group, even if no bond is directly formed between an atom in the first group to an atom in the second group. The metal/metal oxide binding group can be reacted with the metal surface by various coating methods, including dip coating. In some embodiments of the method the metal binding group is part of a first acrylate ester molecule, and the PFPE group is part of a second acrylate ester molecule. The two acrylate esters can then be reacted to form a pentanone ester in the presence of an initiator. The initiator must function to break the terminal carbon-carbon double bond in one or both molecules, converting the molecule to a radical. Some embodiments of the method employ a photoinitiator, such as an organic peroxide, benzoyl peroxide, IRGACURE 184R (1-hydroxycyclohexyl-1-phenyl methanone). Further embodiments of the method employ a photoinitiator of the α-hydroxyketone class, as well as a-aminoketones, phenylglyoxylates—largely determined by solubility and initiation/excitation wavelength. The mixture of photoinitiator and acrylate esters can then be exposed to electromagnetic radiation of an appropriate wavelength to produce radical species (such as ultraviolet).

In a preferable embodiment, the article of the present invention can be produced by (i) treating a surface of the metal substrate with the phosphoric acid derivative to form the phosphate binding layer on the surface of the metal substrate, and then (ii) treating a surface of the phosphate binding layer with the fluoropolyether compound having a fluoropolyether group and a carbon-carbon double bond to form the fluoropolyether layer on the surface of the phosphate binding layer.

In one embodiment, the phosphate binding layer is cured after step (i) and before step (ii), and then the fluoropolyether layer is cured after step (ii).

In another embodiment, step (ii) may be performed before curing the phosphate binding layer, and the phosphate binding layer and the fluoropolyether layer are cured after step (ii).

In one embodiment, the phosphate binding layer and/or the fluoropolyether layer may be cured by either applying heat to the layers (heat cureing) or irradiating the layers to the ultraviolet light (UV curing). In a preferable embodiment, the UV curing is used.

The article of the present application can be used as members or parts of members listed below:

kitchen and bathroom faucets, taps, handles, spouts, sinks, drains, hand rails, towel holders, curtain rods, dish washer panels, refrigerator panels, stove tops, stove panels, oven panels, microwave panels, exhaust hoods, grills, metal wheels or rims, scissor blades, paper cutters, paper shredders, shaving blades, cutting tools, stamping dies, molds, windows, mirrors, eyeglass lenses, tile, tubs, toilets, and sinks; household electrical appliance parts such as fan blades, electronic range doors, refrigerator panels, etc.; office equipment parts such as copying machine contact glass, OHP body mirror, OHP sheet, keyboard, telephone receiver, desk top, etc.; home appliances and furniture such as glasses, cupboard door, looking glass, window panes, lamp shades, chandeliers, etc.; building materials such as show window, telephone box, and water tank glass members; vehicle parts such as rolling stock glass, coated surfaces of vehicle bodies, etc.; personal articles such as spectacle frames, swimming goggle glass, goggles, helmets, clockface glass, etc.; amusement equipment parts and products such as pinball machine glass panels, playing cards, mahjong tiles, etc.; coated surfaces of furniture and pianos; personal accessories such as tie pins, necklaces, pierce-type earrings, etc.; metal or metal-plated members such as faucets, brasswind and woodwind instruments, golf clubs, door handles, dumbbells, cutters, etc.; ceramic products such as insulators, tiles, toilet fixtures, tableware, roofing tiles, etc.; stone products such as tombstones, go stones, marbles, etc.;

paper products such as wallpaper, screen-door paper, books, posters, photographs, etc.; and leather goods such as wallets, boots and shoes, bags, wristwatch bands, baseball gloves, etc.

In a preferable embodiment, the article of the present application can be used as members or parts of members such as kitchen and bathroom faucets, taps, handles, spouts, sinks, drains, hand rails, towel holders, curtain rods, dish washer panels, refrigerator panels, stove tops, stove panels, oven panels, microwave panels, exhaust hoods, grills, metal wheels or rims, scissor blades, paper cutters, paper shredders, shaving blades, cutting tools, stamping dies, molds, windows, mirrors, eyeglass lenses, tile, tubs, toilets, and sinks.

EXAMPLES

Preparation of Compositions

Bis[2-(methacryloyloxy)ethyl] phosphate (0.08 g) was dissolved in isopropyl alcohol and diluted with additional isopropyl alcohol to a total solution mass of 200 grams to obtain the composition for forming the phosphate binding layer (Composition A).

PFPE acrylate ester commercial product (1.0 g, 20% PFPE acrylate ester in solvent) was added to 1-methoxy-2-propanol (199 g). To this solution, Irgacure 184 (0.01 g) was added to obtain the composition for forming the fluoropolyether layer (Composition B).

Example 1

A SUS substrate was cleaned by scrubbing with acetone, scrubbing with isopropyl alcohol, rinsing with water, air drying, and placing in an UV/ozone cleaner for a total of 9 minutes of UV/O exposure.

The SUS 304 substrate was place in Composition A with stirring up to 2 h. The substrate was then removed from Composition A, and the excess composition was drained, rinsed with isopropyl alcohol, drained of excess isopropyl alcohol. The substrate treated above was dipped in Composition B for 2-3 minutes. The substrate was removed from Composition B, drained excess Composition B from the substrate, allowed to air dry. Then, the substrate was placed in an oven at 50° C. for 10 minutes to completely remove any solvent. Following the solvent remove steps, the substrate was passed through a Dymax UVCS-F-230 UV conveyor oven at a rate of 20 feet per minute. The substrate was run through the conveyor for a total of 4 passes. Thus, the phosphate binding layer and the fluoropolyether layer were formed on the SUS substrate.

Examples 2

The substrate was treated similar to Example 1, except that the Al substrate was used in place of the SUS substrate.

Comparative Examples 1

The SUS substrate was treated similar to Example 1, except that the SUS 304 substrate was directly treated with Composition B without using Composition A.
Evaluation
Evaluation of Contact Angle
Static contact angles of water and n-hexadecane (water contact angle (WCA) and n-hexadecane contact angle (HCA)) were measured for 2 μL by using a contact angle measuring instrument (manufactured by Biolin Scientific, "KSV CAM 200"). The results are shown in Table 1 below.

Evaluation of Abrasion Durability

A cotton abrasion durability evaluation was performed as an abrasion durability evaluation. Specifically, AATCC crockmeter with additional weight to provide 1 Kgf downforce operated at 100 cycles per minute with a stroke length of 6.5 cm. 100% cotton pique cloth as the abrading material. The static contact angle of water was measured every 1,000 cycles. The durable times was decided as the abrasion time at the point that the measured value of the contact angle became to be 100 degree or less. The results are shown in Table 1 below.

TABLE 1

| | Substrate | Compositions used | Initial WCA (degree) | Initial HCA (degree) | Durable Times |
|---|---|---|---|---|---|
| Example 1 | SUS 304 | A + B | >110° | about 70° | >12,000 |
| Example 2 | Al | A + B | >110° | about 70° | >12,000 |
| Comparative Example 1 | SUS 304 | B | >110° | about 70° | 1,000 |

INDUSTRIAL APPLICABILITY

The present invention is suitably applied for treating on a surface of metal substrate.

The invention claimed is:
1. An article which comprises a metal substrate, a phosphate binding layer, and a fluoropolyether layer,
wherein
the fluoropolyether layer is formed of a fluoropolyether compound having a fluoropolyether group and a carbon-carbon double bond,
the fluoropolyether compound having a fluoropolyether group and a carbon-carbon double bond is a compound obtained by reacting:
(A) a triisocyanate prepared by trimerizing a diisocyanate, with
(B) a combination of at least two active hydrogen-containing compounds wherein the component (B) comprises:
(B-1) a fluoropolyether having at least one active hydrogen, and
(B-2) a monomer having an active hydrogen atom and a carbon-carbon double bond,
the phosphate binding layer is formed of a phosphoric acid derivative,
the phosphoric acid derivative is a compound of the formula:

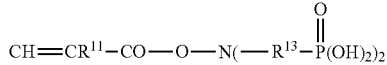

wherein:
$R^{11}$ is each independently H or a $C_{1-3}$ alkyl group,
$R^{13}$ is each independently a divalent organic group,
the metal substrate is a SUS substrate.
2. A process for producing the article as claimed in claim 1, which article comprises a metal substrate, a phosphate binding layer, and a fluoropolyether layer, the process comprising:

(i) treating a surface of the metal substrate with a phosphoric acid derivative to form the phosphate binding layer on the surface of the metal substrate, and
(ii) treating a surface of the phosphate binding layer with a fluoropolyether compound having a fluoropolyether group and a carbon-carbon double bond to form the fluoropolyether layer on the surface of the phosphate binding layer.

3. The process for producing as claimed in claim 2, the process further comprising irradiating the phosphate binding layer and the fluoropolyether layer with ultraviolet light.

* * * * *